United States Patent [19]

Foulkes

[11] 4,061,843

[45] Dec. 6, 1977

[54] BATTERY PLATES

[75] Inventor: Stanley Charles Foulkes, Bolton, England

[73] Assignee: Chloride Group Limited, London, England

[21] Appl. No.: 643,908

[22] Filed: Dec. 23, 1975

Related U.S. Application Data

[63] Continuation-in-part of Ser. No. 623,897, Oct. 20, 1975.

[30] Foreign Application Priority Data

Dec. 23, 1974 United Kingdom ............... 55500/74
Oct. 15, 1975 United Kingdom ............... 42226/75

[51] Int. Cl.$^2$ ............................................. H01M 2/18
[52] U.S. Cl. ................................... 429/136; 429/140; 429/178; 429/228; 429/238
[58] Field of Search ............................. 136/67, 26, 43; 429/136–139, 140, 141, 178, 228, 238

[56] References Cited

U.S. PATENT DOCUMENTS 3,099,586 7/1963 Duddy ............................... 136/67 X
3,267,190 8/1966 Malloy ............................... 136/43 X Primary Examiner—C. F. LeFevour
Attorney, Agent, or Firm—Oblon, Fisher, Spivak, McClelland & Maier

[57] ABSTRACT

There is disclosed an improved tubular battery plate comprising a porous envelope enclosing a current collector comprising an array of members extending perpendicularly from an end member which affords a current take off lug with active material disposed between the perpendicular current collector members and the inside face of the porous envelope the ratio of the length of the tubes in cms to the free cross sectional area in sq. cms being in the range 100.1 to 295.1 and the degree of stratification of the active material in the tubes being less than 5%.

3 Claims, No Drawings

BATTERY PLATES

This application is a continuation-in-part of my application Ser. No. 623,897 filed Oct. 20, 1975.

The present invention relates to novel tubular battery plates.

One conventional form of such plate has fabric tubes impregnated with a resin to render them stiff though still permeable, the tubes are located on an array of lead alloy spines, one spine to each tube, and the space between the interior of the tubes and the spines is filled with active material e.g. lead oxide powder from a hopper and the assembly is shaken to compact the power in the tube. These plates suffer from unevenness of filling, the active material tending to become over consolidated at what is the bottom of the tubes during filling but is the top of the tubes in use.

According to the present invention a tubular battery plate comprising a porous envelope enclosing a current collector comprising an array of members extending perpendicularly from an end member which affords a current take off lug with active material disposed between the perpendicular current collector members and the inside face of the porous envelope is characterised in that the ratio of the length of the tubes in cms to the free cross sectional area in sq. cms is in the range 100:1 to 295:1 and the degree of stratification of the active material in the tubes is less than 5%.

The plate also has the desirable characteristic that prior to electrolytic formation of the plate the fabric can be cut away from the active material and the active material will remain as a continuous body even if dried out provided the plate is not subjected to shock. Thus the powder filled plate described above will fragment if the fabric is removed.

The term envelope covers arrays of separate tubes as well as arrays of tubes joined together or formed from sheets of material in addition to covering any envelope effective to form a bag or pocket around the current collecting element or elements of the plate and effective to filter out active material as a bed around the current conducting element or elements.

As indicated below, it is preferred to use a composition in which the active material particles have an average particle size in the range 5 to 20 microns.

However, material with average particle sizes in the range 1 to 30 or 50 microns can equally well be used so long as the tube material still has adequate filtration action.

The active material may be any desired for the particular battery being made and whilst the invention is described with reference to lead acid batteries the teaching of the invention concerning the necessary requirements for the active material composition and the material of the envelope, whereby filtration filling is achieved and a bed of active material is built up from the bottom of the envelope (the top in use) can be applied to other electrochemical systems.

Referring again to lead acid systems the lead oxides preferably has substantially all of its particles having particle sizes less than 100 microns, e.g., less than 1% by weight are above 200 microns in diameter. In addition, less than 1% is below 0.001 micron in diameter. Typically, at least 50%, e.g., 95% by weight, is less than 50 microns, 50% by weight is less than 10 microns and 5% is less than 1 micron. The oxide may comprise a blend of grey lead oxide of average particle size 20 microns and red lead oxide of average particle size 5 to 10 microns.

The ratio of grey to red lead may be in the range 95:5 to 5:95 through 90:10 to 50:50, e.g. 33.67 is preferred.

These particle sizes were determined by sieving.

More specifically we prefer to use slurry compositions containing grey lead oxide or red lead oxide or blends of grey lead oxide and red lead oxide in a range of ratios by weight of 66.34 to 33.67.

The material of the tube as indicated above is selected to have a filtering action on the active material used. However this does not mean that all the active material is removed from the liquids issuing from the tubes merely that a proportion is retained within the tubes.

As mentioned above the ratio of active material to liquids which should be used depends on a variety of factors including the nature of the material from which the tubes are made.

A balance must be struck between the need for the material to have a high water permeability to provide good conductivity in use in the battery and the need for the material to have a good filtering action so as to enable filling to be carried out rapidly and the active material to be retained in the tubes over long periods of use and under conditions of shock and vibration. One suitable material is made from a non-woven batt of polyester fibres which is 0.5 to 0.7 mm. thick and weight 120 to 160 grams per sq. cm. This is not perforated, it porosity being derived from the various gaps between the fibres from which it is made. It has a nitrogen permeability (as hereinafter defined) of 8.0 liters/sq.cm./minute, and a water permeability (as hereinafter defined) of 1.5 liters/sq.cm./minute.

More broadly, it is preferred to use a material having a nitrogen permeability in the range 0.5 to 20 preferably 1 to 10 or more preferably 3 to 9 liters/sq/cm./min. Desirably, it should also have a water permeability of at least 0.01 liters/sq.cm./min, preferably 0.1 or 0.5 to 1, 2 or 5 liters per minute or more.

The plate preferably has the following construction. The current collecting member consists of a top bar with a number of spines of conventional lead alloy composition and of conventional structure being located on the top bar at centres corresponding to the centres of the tubes with which they will be used. They are desirably provided with short axial fins which are used to centre the spines in the tubes and to prevent the spines being distorted during handling prior to filling.

The plates were positive plates having 15 tubes each 9 inches long. The tubes were made of nonwoven polyethylene terephthalate fibre. This is made as follows:

A thin web (1.5 meters wide) of fibres having an average length of 4½ inches is produced by carding, and a fleece is produced by layering approximately 10 webs to form a continuous length of non-woven fabric (also 1.5 meters wide).

The fibres extend generally longitudinally in the web, which is pleated in a zig-zag fashion as it is taken off from a conveyor travelling in the direction of the length of the web onto a conveyor travelling at right angles thereto. Thus the fibres extend substantially transversely to the length of the fleece, but due to the travel of the second conveyor the fibres in adjacent layers are oppositely inclined at a small angle to the transverse direction.

This material is then impregnated with 50% by weight of polyacrylic binder. It has a thickness of 0.5 to 0.7 mm. and weighs 120 to 160 grams/sq.cm.

This material is then converted into an array of tubes by passing two layers of it through a multiple sewing machine to secure the layers together along parallel lines (for example, spaced about two to the inch) to form pockets or tubes in the conventional manner.

This material is then dipped in a phenolic resin and dried. The material picks up 30% of phenolic resin based on the dry weight of the non-woven material. After cutting the material to length circular section mandrels 0.287 inches in diameter are then inserted between the rows of stitches to form the pockets. It has an air permeability of 8.0 liters/min/sq.cm. and a water permeability of 1.5 liters/min/sq. cm. area.

This non-woven fabric is made up of randomly entangled individual fibres. The fibres have a diameter of about 25 microns or more broadly 20 to 50 microns. The gaps between individual fibres are in general less than 250 microns and mostly less than 100 microns and moreover the material in having a thickness of 0.5 to 0.7 mms has a three dimensional structure permitting the overlap of many individual fibres in any one path from face to face of the sheet. The material has an excellent filtering activity for use in accordance with the present invention since whilst it permits passage of both liquids and solids in the tube shape it rapidly fills with active material when this is fed or poured into the tubes under gravity.

Air permeability was measured as follows:

A sample 2.8 cm, in diameter (6.16 sq.cm. effective cross-sectional area) was clamped in position and the time for 50.1 of dry nitrogen to flow through the sample at 20° C under a pressure difference of 0.6 inches (1.5 cms) water gauge was recorded.

The material is too permeable for mercury porosimetry or air flow through an alcohol saturated sample to be accurate measurement techniques.

However, air permeability is known to be an accurate reflection of the filtering capacity of a material and thus materials suitable for use in this invention can be selected by measurement of their air permeability.

Water permeability was measured on the same sample by measuring the time taken for a column of water initially 42 cm. high and 1 liter in volume to flow under gravity through the sample.

The downstream end of the column below the sample was blocked off, the water introduced above the sample and then the downstream end below the sample opened to atmosphere.

Two other fabrics may also be used.

One is a spun woven fabric, having an air permeability (as herein defined) of 6.0 liters/sq.cm./min. It has 17 weft threads per cm and 22 warp threads per cem. The warp threads being about 250 microns in diameter and the weft threads being about 375 microns in diameter. Microscopic examination indicates that the gaps between adjacent warp threads and adjacent weft threads are about 250 microns by 250 microns maximum but these gaps are bridged by numerous loose fibres extending out from the threads. The effective filtering capability of the fabric is thus much enhanced.

The other fabric was a woven fabric, having an air permeability (as herein defined) of 15.2 liters/sq. cm/minute.

It has 18 weft threads per cm and 22 warp threads per cm. The warp and weft threads being about 250 microns in diameter. Microscopic examination indicates that the gaps between adjacent warp threads and adjacent weft threads are about 250 microns by 250 microns and are not occluded by fibres extending out from the threads. The filtering capability of this fabric is thus much less than that of the spun woven fabric.

The specification of our copending U.S. application Ser. No. 623,897 filed Oct. 20, 1975 describes in detail the method by which such plates can be made and it is not thought necessary to repeat that disclosure herein.

Attention however is directed to table 3 of that specification which gives details of the stratification or variation in weight of active material contained in four equal sized portions for examples 15, 18, 19, 20, 21, 22, 24 and 28 which are all examples of the present invention.

Thus as described in our British application No. 55500/74, for plates filled by the method of that application, there is no significant weight variation between the top, middle and bottom of the tubes.

For clarity we reproduce the relevant portion of table 3 of the above mentioned complete specification as table 1 of the present specification with the examples renumbered as 1 to 7.

TABLE 1

| Example | Grey red | Solids liquids | % Sulphation of the grey oxide | Stratification Top D | middle C | B | bottom A | A − D | Mean | % deviation |
| --- | --- | --- | --- | --- | --- | --- | --- | --- | --- | --- |
| 1 | 66:34 | 2.49:1 | none | 271 | 268 | 277 | 279 | +8 | 274 | ± 2% |
| 2 | 66:34 | 1.97:1 | none | 291 | 288 | 295 | 288 | −3 | 291 | ± 1% |
| 3 | 66:34 | 1.44:1 | none | 299 | 290 | 294 | 295 | −4 | 295 | ± 1.5% |
| 4 | 66:34 | 1.11:1 | none | 309 | 305 | 293 | 290 | −19 | 299 | ± 3% |
| 5 | 66.34 | 1.07:1 | none | 278 | 282 | 279 | 276 | −2 | 279 | ± 1% |
| 6 | 66.34 | 0.54:1 | none | 314 | 304 | 296 | 289 | −25 | 301 | ± 4% |
| 7 | 100:0 | 1.65:1 | none | 283 | 280 | 278 | 273 | −10 | 279 | ± 2% |

EXAMPLES 8 to 13

Table 2 gives stratification results obtained without selection of a series of six plates produced using the same technique for each plate. The technique was as described for the examples of the above complete specification. The slurry used was a 66.34 red lead oxide to grey lead oxide mixture, containing 1.5 parts of oxide to 1 part of water with zero % sulphation. The slurry was made from mixtures of grey lead oxide (average particle size 20 microns) and red lead oxide (average particle size 5 to 10 microns).

The solid particles in the slurry were such that less than 1% by weight were above 200 microns, and less than 1% were below 0.001 microns, 95% by weight were less than 50 microns. These particle sizes were determined by seiving. The shut off pressure was 25 psi. The plates were as described for Examples 1 to 26 of the above complete specification and the fabric tubes were the non woven tubes described above.

The tubes were 32.5 cms long and had an internal diameter of 0.281 inches (0.71 cms). The lead spines had a diameter of 0.125 inches (0.3175 cms). The free cross-sectional area of the tubes was thus 0.32 sq. cms.

The ratio of tube length to free cross-sectional area was 101:1.

More broadly it is preferred to use tubes having ratios of tube lengths to free cross sectional area in the range 100:1 to 295:1 especially 100:1 to 45:1.

Stratification is determined by pickling the plates after filling in 1.40 specific gravity sulphuric acid for 6 hours followed by drying at 180° F for 12 hours.

The top bar and the bottom bar were then cut off the plate and the remainder cut into three or four equal horizontal strips labelled A B C and D with A at the bottom bar end of the plate. These were then weighed.

Degree of stratification is the maximum deviation of the weight of active material in a single horizontal portion from the average of the weights of active material in all the portions when the plate is cut into three or four equal portions along lines parallel to the said end member.

Table 2

| Example | stratification top D | middle | bottom A | A − D | Mean | % deviation |
|---|---|---|---|---|---|---|
| 8 | 239 | 237 | 241 | 2 | 239 | ±0.8 |
| 9 | 234.5 | 238.5 | 242.5 | 8 | 238.5 | ±1.4 |
| 10 | 235.5 | 235.5 | 237 | 1.5 | 236.0 | +0.4 −0.2 |
| 11 | 229.5 | 241.5 | 251.5 | 22 | 241 | + 4.4 −4.8 |
| 12 | 246.5 | 237.5 | 244.5 | −2 | 243 | +1.4 −2.3 |
| 13 | 243 | 241 | 244 | 1 | 243 | +0.4 −0.8 |

EXAMPLES 14 TO 19

Table 3 below gives the results obtained without selection of a series of six plates of identical size, shape and fabric to Examples 8 to 13 produced by the conventional dry powder filling described above using the same dry oxide mixture as was used in the slurry of Examples 8 to 13.

Table 3

| Example | stratification top D | middle | bottom A | A − D | Mean | % deviation |
|---|---|---|---|---|---|---|
| 14 | 266 | 242 | 235 | −31 | 248 | +11.3 −9.3 |
| 15 | 280.5 | 257.5 | 247 | −33.5 | 262 | + 7.1 − 5.7 |
| 16 | 282 | 258.5 | 244.5 | −37.5 | 262 | + 7.6 − 6.7 |
| 17 | 274.5 | 266.5 | 247.5 | −27 | 263 | + 4.4 − 5.9 |
| 18 | 267 | 259 | 239.5 | −27.5 | 255 | + 4.7 − 6.1 |
| 19 | 274.5 | 253 | 244.5 | −30 | 257 | + 6.8 − 4.9 |

A comparison of the results of tables 2 and 3 makes it clear that the density variations in the prior art plates are all substantially higher than those for the plates of the present invention and moreover the average positive and negative deviations for these 6 prior art plates are +7.0 and −6.4 whilst the average positive and negative deviations for the plates in accordance with the present invention are +1.5 and −1.7.

When these examples 8 to 13 were repeated using a paste of 3 parts oxide to 1 of water, (which had a density of 3.5 grams/cc), the material was essentially extruded into the tubes which filled in less than 1 second. No significant amount of liquor passed through the tubes, and the plates on testing demonstrated significant stratification of density in the tubes.

What I claim as my invention and desire to secure by Letters Patent is:

1. A lead acid tubular battery plate comprising a porous envelope enclosing a lead or lead alloy current collector comprising an array of members extending perpendicularly from an end member which affords a current take off lug with lead oxide active material disposed between the perpendicular current collector members and the inside face of the porous envelope characterised in that the ratio of the length of the tubes in cms to the free cross sectional area in sq. cms is in the range 100:1 to 295:1 and the degree of stratification of the active material in the tubes is less than 5%.

2. A lead acid tubular plate as claimed in claim 1 in which the ratio of the lengths of the tubes in cms to the free cross sectional area in sq. cms. is in the range 100:1 to 180:1.

3. A lead acid battery incorporating one or more plates as claimed in claim 1.

* * * * *